US012731382B2

(12) United States Patent
Lu et al.

(10) Patent No.: US 12,731,382 B2

(45) Date of Patent: Sep. 8, 2026

(54) DEEP LEARNING BACKDOOR ATTACK METHOD AND DEVICE BASED ON ORDINAL NETWORK AND MEDIUM

(71) Applicants: BEIHANG UNIVERSITY, Beijing (CN); BEIJING UNIVERSITY OF TECHNOLOGY, Beijing (CN)

(72) Inventors: Yunfeng Lu, Beijing (CN); Chao Li, Beijing (CN); Yanfang Liu, Beijing (CN); Guoyan Chen, Beijing (CN); Zhiming Gui, Beijing (CN); Xinrui Ma, Beijing (CN)

(73) Assignees: BEIHANG UNIVERSITY, Beijing (CN); BEIJING UNIVERSITY OF TECHNOLOGY, Beijing (CN)

(*) Notice: Subject to any disclaimer, the term of this patent is extended or adjusted under 35 U.S.C. 154(b) by 261 days.

(21) Appl. No.: 18/616,340

(22) Filed: Mar. 26, 2024

(65) Prior Publication Data

US 2025/0308213 A1 Oct. 2, 2025

(51) Int. Cl.

| | |
|---|---|
| ***G06V 10/774*** | (2022.01) |
| ***G06F 21/57*** | (2013.01) |
| ***G06V 10/77*** | (2022.01) |
| ***G06V 10/82*** | (2022.01) |

(52) U.S. Cl.

CPC .......... *G06V 10/774* (2022.01); *G06F 21/577* (2013.01); *G06V 10/7715* (2022.01); *G06V 10/82* (2022.01); *G06F 2221/033* (2013.01)

(58) Field of Classification Search

CPC .. G06V 10/774; G06V 10/7715; G06V 10/82; G06F 21/577

See application file for complete search history.

(56) References Cited

U.S. PATENT DOCUMENTS

| | | | | |
|---|---|---|---|---|
| 11,977,626 | B2 * | 5/2024 | Andreina | G06N 3/08 |
| 12,182,897 | B2 * | 12/2024 | Ding | G06V 10/776 |
| 2021/0019399 | A1 * | 1/2021 | Miller | G06F 21/554 |
| 2021/0303695 | A1 * | 9/2021 | Grosse | G06F 17/18 |
| 2022/0027462 | A1 * | 1/2022 | Jiang | G06N 3/0464 |
| 2022/0245243 | A1 * | 8/2022 | Andreina | G06N 3/09 |
| 2022/0292185 | A1 * | 9/2022 | Andreina | G06N 3/0464 |
| 2023/0409715 | A1 * | 12/2023 | Nissim | G06F 9/45533 |

OTHER PUBLICATIONS

Pessa et al, Mapping images into ordinal networks, Nov. 20, 2020, American Physical Society, 14 pages (Year: 2020).*

* cited by examiner

*Primary Examiner* — Mohammed H Zuberi

(74) *Attorney, Agent, or Firm* — HOWARD M COHN and Associates, LLC

(57) ABSTRACT

The present invention discloses a deep learning backdoor attack method and device based on an ordinal network and a medium, which belongs to the technical field of neural network security. The method comprises: obtaining a training sample image; generating an ordinal network based on the training sample image, wherein the ordinal network is used for representing an exact structure of an image; and generating a trigger by using the ordinal network. Through the above method, and the device and the medium for realizing the above method, the present invention uses the ordinal network to generate the trigger, improves the concealability of a poisoning sample compared with poisoning samples generated by other attack methods, and can promote the further research of a hidden backdoor attack defense method in the academic circle.

8 Claims, 3 Drawing Sheets

| Output sample of clean model | Output sample of BadNet model | Output sample of Blend model | Output sample of Input-Aware model | Output sample of model of the present invention |
|---|---|---|---|---|
| | | | | |

FIG. 3

DEEP LEARNING BACKDOOR ATTACK METHOD AND DEVICE BASED ON ORDINAL NETWORK AND MEDIUM

TECHNICAL FIELD

The present invention relates to the technical field of neural network security, in particular to a deep learning backdoor attack method and device based on an ordinal network and a medium.

BACKGROUND

At present, great progress has been made in the application of deep neural networks in many fields such as computer vision, natural language processing, automatic driving, biometrics recognition, etc. However, due to the vulnerability of fully connected deep neural network DNN models, the models are vulnerable to backdoor attacks and security risks. Thus, related research has attracted wide attention.

In the training process of the DNN model, an attacker adds a trigger to a training sample to implant a backdoor in the DNN model to control the prediction result of the model. The training sample with the trigger added is called a poisoning sample, and the model implanted with the backdoor is called a poisoning model. The poisoning model behaves on a clean sample basically the same as a normal model, but gives wrong output when dealing with the poisoning sample.

For DNN models of image classification, researchers have proposed some backdoor attack methods. From the perspective of the generation mode of the trigger, there are mainly two types: static trigger generation method and dynamic trigger generation method. At present, the two types of methods have different problems, such as poor detection resistance of poisoning DNN models and poor concealability of the poisoning sample. It is not conducive to the further deep research of fully connected neural network attack defense technologies.

SUMMARY

In view of this, the present invention provides a deep learning backdoor attack method and device based on an ordinal network and a medium, to overcome the problem of limited development of the backdoor attack defense field caused by low visual hiding of poisoning samples and low success rate of model attack in the deep learning backdoor attack method in the prior art.

In order to achieve the above purpose, the present invention adopts the following technical solution:

The present invention firstly discloses a deep learning backdoor attack method based on an ordinal network, which comprises the following steps:

- obtaining a training sample image;
- generating an ordinal network based on the training sample image;
- generating a trigger by using the ordinal network, wherein the trigger is used for generating a malicious image.

Further, generating an ordinal network based on the training sample image specifically comprises the following steps:

- extracting an image pixel matrix of the training sample image;
- dividing nodes of the image pixel matrix by taking a sub-pixel matrix composed of adjacent d1×d2 pixel values in the image pixel matrix as a node;

- expanding and indexing the pixel values in each node from left to right and from top to bottom, to generate pixel ordinals represented by index value numbers;
- reordering the pixel ordinals of each node according to pixel value sizes corresponding to index values;
- mapping nodes after reordering of the pixel ordinals to a digraph, and generating an ordinal network by taking a direction from left to right and from top to bottom when the nodes are divided as a positive direction of an edge that connects two digraph nodes in the digraph.

Further, mapping nodes after reordering of the pixel ordinals to a digraph specifically comprises:

- classifying the digraph nodes corresponding to the nodes with the same pixel ordinal ordering results into the same kind of digraph nodes and superimposing the digraph nodes.

Further, extracting an image pixel matrix of the training sample image specifically comprises:

- splitting the training sample image according to three channels of RGB, to obtain the training sample image of a single channel;
- extracting an image pixel matrix of the training sample image of the single channel as an image pixel matrix of the training sample image.

Further, generating a trigger by using the ordinal network specifically comprises the following steps:

- calculating a local node entropy of each digraph node in an ordinal network graph;
- taking the digraph node corresponding to a maximum calculation result of the local node entropy as a key node in the ordinal network graph;
- obtaining a pixel ordinal corresponding to the key node and randomly generating a new pixel ordinal based on the pixel ordinal;
- taking the new pixel ordinal as the trigger.

Further, calculating a local node entropy of each digraph node in an ordinal network graph specifically comprises the following formula:

$$p_{i,j} = \frac{\text{total of transitions } \prod_i \to \prod_j \text{ in } \{\pi_s^t\}_{s=1,\ldots,n_x}^{t=1,\ldots,n_y}}{2n_x n_y - n_x - n_y}$$

$$p'_{i,j} = p_{i,j} / \sum_k p_{i,k};$$

$$h_i = -\sum_{j \in O_i} p'_{i,j} \log_2 p'_{i,j};$$

In the formula, $p_{i,j}$ represents a weight of an edge that connects a digraph node i to a digraph node j in the ordinal network graph; total of transitions $$\prod_i \to \prod_j \text{ in } \{\pi_s^t\}_{s=1,\ldots,n_x}^{t=1,\ldots,n_y}$$

represents the total number of horizontally sorted sequences and vertically sorted sequences in the image pixel matrix $$\{\pi_s^t\}_{s=1,\ldots,n_x}^{t=1,\ldots,n_y},$$

wherein s represents a horizontal direction; t represents a vertical direction; $n_x$ represents the number of horizontal nodes; and $n_x$ represents the number of vertical nodes.

$p'_{i,j}$ represents a permutation probability of edges that connect the digraph node i to the digraph node j in ordinal network graph.

$h_i$ represents the local node entropy of the digraph node i; $\mathcal{O}_i$ represents a set of all digraph nodes starting from the digraph node i in the ordinal network graph, and $k \in \mathcal{O}_i$.

Further, the above deep learning backdoor attack method based on the ordinal network further comprises mixing the feature representation of a malicious image with the feature representation of a benign image by using regularization terms.

In another aspect, the present invention further discloses a deep learning backdoor attack device based on an ordinal network, comprising a host computer, and the host computer can implement any of the deep learning backdoor attack method based on the ordinal network in the present invention when executing programs.

In addition, the present invention further discloses a computer readable storage medium, wherein computer programs are stored on the computer readable storage medium, and when the computer programs are executed by a processor, any of the deep learning backdoor attack method based on the ordinal network in the present invention is implemented.

According to the above technical solution, compared with the prior art, the present invention discloses a deep learning backdoor attack method and device based on an ordinal network and a medium, which has the following beneficial effects:

The present invention uses the ordinal network to dynamically generate the trigger, so that a poisoning sample generated by the attack method of the present invention improves the concealability of the poisoning sample compared with the poisoning sample generated by other attack methods, which can promote the further research of a hidden backdoor attack defense method in the academic circle, and stimulate the research of the demand for the detection of backdoor in a deep neural network to make an artificial intelligence model more robust.

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely embodiments of the present invention, and for those ordinary skilled in the art, other drawings can also be obtained according to the provided drawings without contributing creative labor.

FIG. 3 is a schematic diagram of malicious images generated by different attack methods provided by embodiments of the present invention.

DETAILED DESCRIPTION

Technical solutions in the embodiments of the present invention are described clearly and fully below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
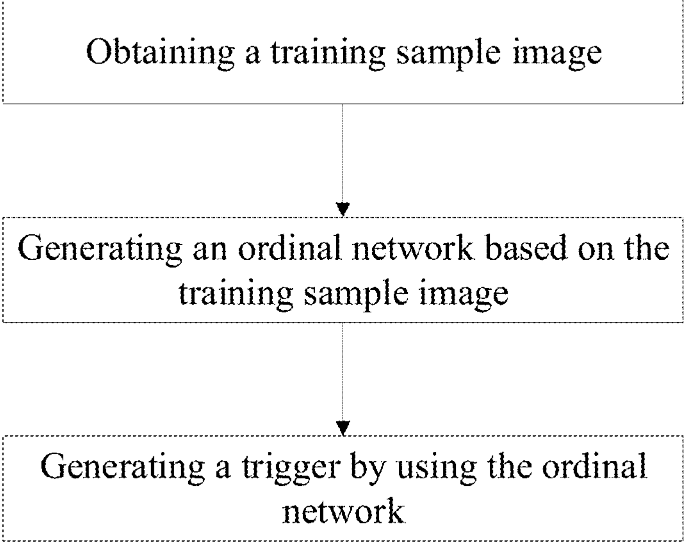
FIG. 1 is an overall flow chart of a deep learning backdoor attack method based on an ordinal network provided by the present invention.

On the one hand, an embodiment of the present invention discloses a deep learning backdoor attack method based on an ordinal network, as shown in FIG. 1, comprising the following steps:

obtaining a training sample image;

generating an ordinal network based on the training sample image;

generating a trigger by using the ordinal network.

The principle of the present invention is further explained below in combination with the specific steps.

The first thing to describe is the principle of backdoor attack in a neural network. In a DNN (neural network), a standard supervised classification task can be represented as a mapping function:

$$f_\theta: X \to C, \tag{1}$$

wherein θ represents a parameter of the function, X represents a sample image, C is a classification label, and a training process of a DNN model is a process of learning θ.

A training data set is represented as D:

$$D = \{(xi, yi)\}: xi \in X, yi \in Y, i = 1, 2, 3, N\}, \tag{2}$$

In a backdoor attack, a trigger is added to the sample image to generate a malicious image sample. In the embodiment of the present invention, the malicious image sample is also called a poisoning sample image, and an original label of the sample is changed to a target label of the attack, represented by functions respectively, wherein x represents a benign sample image. In the embodiment of the present invention, the benign sample image is also called a clean sample image. y represents a label corresponding to the clean sample image. The goal of the attack is to conduct model training by taking the poisoning sample image P(x) and the attack target label Q(y) as part of the DNN model training set, induce the DNN model to learn a correlation between the trigger and the target label, and maintain the classification accuracy of the DNN model on the clean sample.

The steps of the present invention are described in detail below.

The steps of generating the ordinal network by using the training sample image are as follows: firstly, the input training sample image is converted into a pixel matrix with the size of H*W*C, wherein H, W and C represent the length, width and channel values of the sample image respectively; and the pixel values in the sample image are (0,255). Then, nodes of the image pixel matrix are divided by taking a sub-pixel matrix composed of adjacent d1×d2 pixel values in the image pixel matrix as a node. d1 is the number of transverse pixel values in the sub-pixel matrix, and d2 is the number of vertical pixel values in the sub-pixel matrix. Then, the pixel values in each node are expanded and indexed from left to right and from top to bottom, to generate pixel ordinals with index values. The pixel ordinals of each node are reordered according to index values. Nodes after reordering of the pixel ordinals are mapped to a digraph, and an ordinal network is generated by taking a direction from left to right and from top to bottom when the nodes are divided as a positive direction of an edge that connects two digraph nodes in the digraph.

In a specific embodiment, in order to reduce the number of pixels and the change amplitude in the sample image, the sample image is divided into three RGB single-channel images, and the image pixel matrix of one channel is extracted as the image pixel matrix of the training sample.

Figure 2:
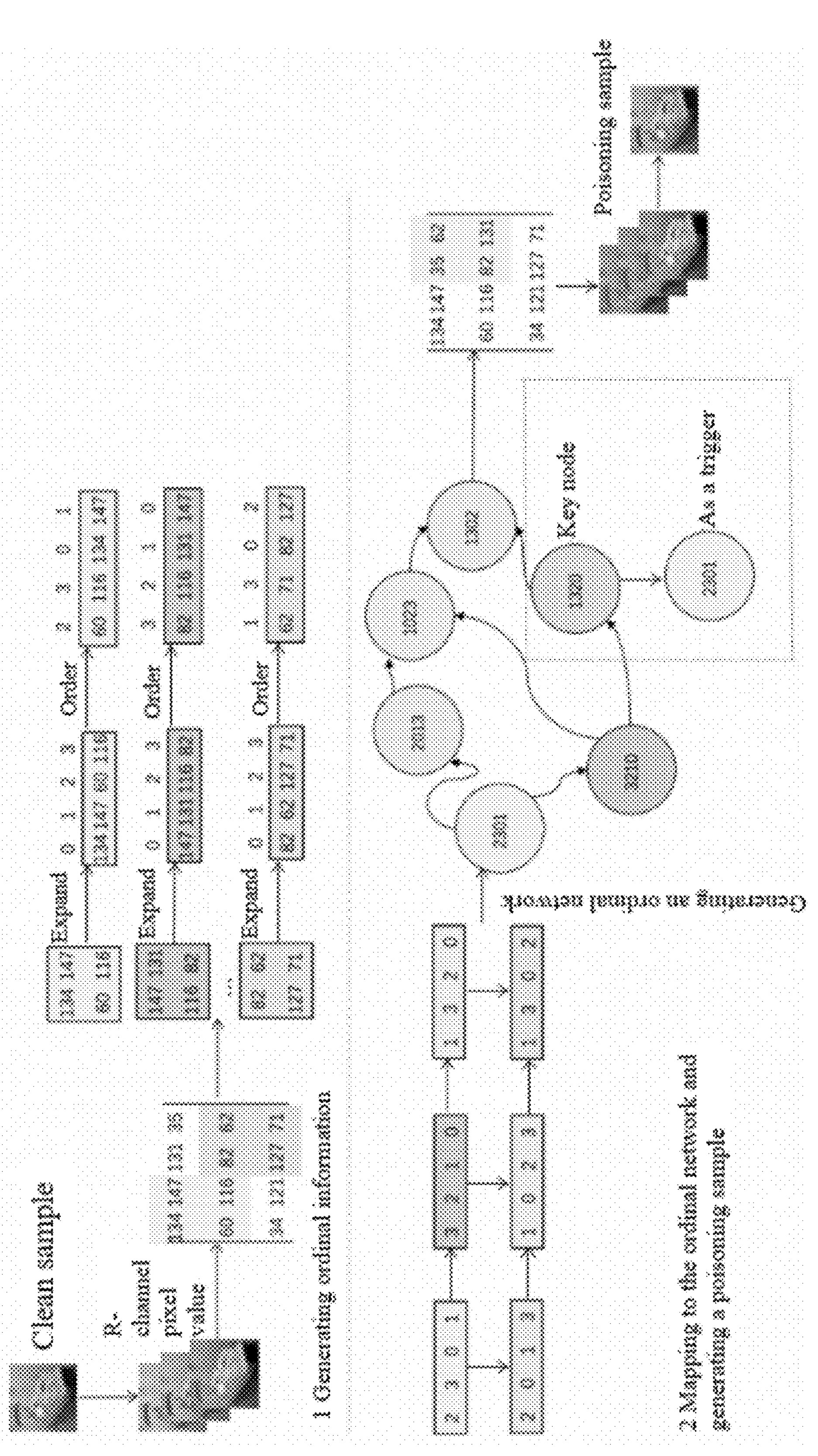
FIG. 2 is a framework diagram of a deep learning backdoor attack network based on an ordinal network provided by the present invention.

As shown in FIG. 2, in a specific embodiment, in the image pixel matrix of the training sample of the clean sample image of the R channel, there are 12 pixel values in three rows and four columns in the image pixel matrix. According to a sliding window method, the size of a sliding window is 2*2; one sliding window is taken as one node; and the step size of the sliding window is 1, that is, one pixel value is moved to the right or down each time to divide the nodes of images corresponding to the image pixel matrix into 6 nodes. For the nodes corresponding to each sliding window, the pixel values of the nodes are expanded from left to right and from top to bottom, and the pixel values are indexed to generate pixel ordinals represented by index value numbers. Then, the pixel ordinals are arranged in ascending order according to the size of the pixel value in each pixel ordinal, and the corresponding index ordering relationship is obtained as a new pixel ordinal. For example, original pixel values in the nodes are (134,147,60,116), and the pixel values [134,147,60,116] are obtained after expansion. The original pixel ordinals [0,1,2,3] are obtained according to the index number, and the new pixel ordinals [2,3,0,1] are obtained after reordering according to the sizes of the pixel values. Each node after reordering of the pixel ordinals is mapped to a digraph. An ordinal network is generated. In the digraph of the ordinal network, a direction from left to right and from top to bottom when the nodes are divided is taken as a positive direction of an edge that connects two digraph nodes.

In another embodiment, when each node after reordering of the pixel ordinals is mapped to the digraph, the digraph nodes corresponding to the nodes with the same pixel ordinal ordering results are classified into the same kind of digraph nodes and superimposed. In this way, in the digraph, the connected edges of the nodes with the same ordering results are also superimposed at the same time, and the number of node types and the number of edges of each type are recorded as node features and edge features which are finally mapped to a digraph. The entire ordinal network graph is represented jointly by the node features and the edge features.

After the ordinal network represented by the digraph is obtained, a digraph node with the maximum arrangement entropy is found as a key node, and mapped to a corresponding pixel value. An ordered relationship is fixed as a trigger. Finally, the poisoning sample and other clean samples are sent into the DNN model as a training set for training, resulting in model poisoning. An attacker can excite a covert backdoor attack by using a poisoning sample with a trigger in an inference phase.

Specifically, after the ordinal network graph is obtained, the local node entropy of each node is calculated as follows:

$$p_{i,j} = \frac{\text{total of transitions} \prod_i \to \prod_j \text{ in } \{\pi_s^t\}_{s=1,\ldots,n_x}^{t=1,\ldots,n_y}}{2n_x n_y - n_x - n_y} \tag{3}$$

-continued $$p'_{i,j} = p_{i,j} / \sum p_{i,k}; \tag{4}$$

$$h_i = -\sum_{j \in O_i} p'_{i,j} \log_2 p'_{i,j}; \tag{5}$$

In the formula, $p_{i,j}$ represents a weight of an edge that connects a digraph node i to a digraph node j in the ordinal network graph; total of transitions $$\prod_i \to \prod_j \text{ in } \{\pi_s^t\}_{s=1,\ldots,n_x}^{t=1,\ldots,n_y}$$

represents the total number of horizontally sorted sequences and vertically sorted sequences in the image pixel matrix $$\{\pi_s^t\}_{s=1,\ldots,n_x}^{t=1,\ldots,n_y},$$

wherein s represents a horizontal direction; t represents a vertical direction; $n_x$ represents the number of horizontal nodes; and $n_x$ represents the number of vertical nodes.

$$p'_{i,j}$$

represents a permutation probability of edges that connect the digraph node i to the digraph node j in ordinal network graph. $h_i$ represents the local node entropy of the digraph node i; $\mathcal{O}_i$ represents a set of all digraph nodes starting from the digraph node i in the ordinal network graph, and $k \in \mathcal{O}_i$.

In the ordinal network, the local node entropy is used for representing the certainty of node correlation of the digraph. When hi=0, it means that only one connected edge is uniquely determined. The larger hi is, the more complex node information is, the more the included information is, the more the permutations of connected edges are, and the more the associated constraints are. The existence and ordering forms of other edges will be affected. These constraints arise from the ordering relationship and the process used for dividing the data nodes. Even if the data is completely random, the constraints may appear. Mapping to the image will affect the change of the texture features of the image. In order not to destroy the performance of an original classification task, and in order to make the generated trigger achieve an attack effect, the local node entropy is considered to measure the importance of the nodes. One of the nodes is used for changing the injected trigger information, and all pixel groups belonging to this ordinal relationship are mapped to the image.

After the key node is obtained, the trigger needs to be produced by using the key node, that is, the trigger information is injected into the training image. Specifically, after an important node is found, this node is mapped back to the pixel value in the corresponding window, and an ordered relationship is fixed as the trigger feature of DNN model learning. The present invention adopts the mode of random arrangement of the index values in the original pixel ordinal to obtain a new pixel ordinal as the trigger feature of the DNN model, that is, the original pixel ordinal is ordered. At this moment, the original pixel ordinal has been restored to the poisoning sample with trigger information, and the poisoning sample is completed.

In the process of training the poisoning model, some poisoning samples and other samples in the training set are delivered into the DNN model for training. DNN will learn the mapping from trigger labels to target labels in the training process. The attacker can excite a covert backdoor attack by using a poisoning sample with a trigger in an inference phase.

The attack method of the present invention does not need to train any auxiliary models, such as auto-encoders and u-nets. Only the ordered relationship changes in the pixel values need to be considered, which can be captured by a machine learning model and used as the trigger.

At present, many studies have shown that the feature representation of poisoning image samples and clean image samples is separable. In recent years, many defense methods have taken this as a starting point to detect poisoning models. Therefore, in order to avoid the existing defense method as much as possible, the goal of the present invention is to mix the feature representation of benign images and the feature representation of malicious images and make it difficult to distinguish. The present invention realizes the above goal by designing a regularization term.

$$L_{etg} = (f_{benign} - f_{backdoor})^2 \tag{5}$$

Wherein $f_{backdoor}$ is the feature representation of the malicious images. $f_{benign}$ is an average value of the benign images whose original mark is equal to the target mark. In this way, it is determined that the features of the benign images and the malicious images are inseparable.

In order to verify the effectiveness of the present invention, the embodiment of the present invention evaluates the attack method from different aspects. Part 1.1 introduces the experimental setup, including the data set and the classification model, and Part 1.2 shows the effectiveness of the method. In addition, the resistance of the model to the existing defense method is measured.

1.1 Experimental Setup

1.1.1 Data Set

The evaluation of the attack method is applied to CIFAR-10, Tiny-ImageNet and CelebA data sets as shown in Table 1. These data sets are often used for the research of the backdoor attack. CIFAR-10 and Tiny-ImageNet are basic data sets used for classification, CelebA is a large-scale facial attribute classification data set, and CelebA data set contains 40 separate binary attribute labels. The present invention selects the first three most balanced attributes, including a smile, a slightly open mouth, and heavy makeup. These attributes are connected together to create eight classification categories.

TABLE 1

Setting of data set

| Date set | Output size | Training set | Test set | Type |
|---|---|---|---|---|
| CIFAR-10 | 32*32*3 | 50000 | 10000 | 10 |
| T-ImageNet | 64*64*3 | 100000 | 10000 | 200 |
| CelebA | 64*64*3 | 100000 | 10000 | 8 |

1.1.2 DNN Classification Model

For CIFAR-10 and Tiny-ImageNet, pre-activation resnet18 is used in the present invention; for CelebA, resnet18 is used in the present invention; and an SGD optimizer is used for training a classifier. A learning rate is 0.01, until the network is trained to converge.

1.1.3 Baseline Method

The present invention compares the designed attack method with BadNet, Blend, Input-Aware attack methods. The backdoor poisoning rate of the baseline setup is 10%, and label 0 is selected as a poisoning label. A model trained on the clean data set is also provided as another baseline for reference. In addition, the defense method of neural cleaning and neural pruning is selected in the present invention to evaluate the resistance of the attack method to the defense.

1.2 Attack Experiment

The performance comparison between the attack method of the present invention and the other three attack methods is shown in Table 2, and the attack effect is shown in FIG. 3. As can be observed, the attack method of the present invention can achieve an attack success rate of more than 99% on the three data sets (BA represents classification accuracy on a clean model, BA represents classification accuracy on a clean model, and ASR represents an attack success rate of a trained poisoning model). In addition, the attack method of the present invention decreases the accuracy of benign test samples by less than 1%. This is smaller than that of the other three attack methods.

TABLE 2

Comparison of attack success rates of different attack methods

| | Clean model | BadNet model | | Blend model | | Input-Aware model | | Model of the present invention | |
|---|---|---|---|---|---|---|---|---|---|
| Data set | BA | BA | ASR | BA | ASR | BA | ASR | BA | ASR |
| CIFAR-10 | 90.53% | 89.87% | 99.98% | 89.59% | 99.70% | 90.14% | 99.48% | 90.04% | 99.57% |
| T-ImageNet | 53.05% | 51.35% | 99.59% | 51.85% | 99.20% | 51.93% | 99.11% | 52.12% | 99.79% |
| CelebA | 78.62% | 77.90% | 100% | 76.55% | 99.50% | 77.28% | 99.57% | 77.75% | 99.98% |

In addition to the models used in the attack in Table 2, the present invention also conducts experiments on more models to further evaluate the universality of the attack method of the present invention to different network architectures, and the results are shown in Table 3. In detail, the present invention uses CIFAR-10 on several other networks and collects ASR and BA of the attack method. In all cases, the attack method of the present invention achieves almost 100% attack success rate, which proves the universality of the attack method of the present invention on different network architectures.

TABLE 3

| Universality on different network architectures | | | |
|---|---|---|---|
| Network | Non-attack | Backdoor attack | |
| architectures | BA | BA | ASR |
| MobileNetV2 | 90.09% | 88.95% | 99.49% |
| SENet18 | 89.71% | 88.21% | 99.38% |
| ResNext29 | 89.31% | 88.91% | 99.25% |
| DenseNet121 | 89.38% | 88.79% | 99.45% |

1.3 Defense Experiment

In this part, the resistance of the model after poisoning to the existing defense methods is evaluated, and the defense methods include neural cleaning and neuronal pruning.

1.3.1 Neural Cleaning Defense Experiment

On the CIFAR-10 data set, an outlier is slightly higher than that of an input perceived backdoor attack method, but on the other two data sets, the attack method of the present invention has the lowest outlier (the higher the outlier is, the more likely the model is to be a poisoning model), which proves that the attack method of the present invention is more resistant to neural cleaning, thereby proving that the defense method is difficult to detect.

1.3.2 Neuronal Pruning Experiment

The present invention researches the resistance of the attack method to the defense method of neuronal pruning. Through verification, it can be seen that the attack success rate of the attack method of the present invention has been stable, with only a slight decrease, while the attack success rates of other attack methods have an obvious decrease. Even if 400 neurons are pruned, the attack success rate of the attack method remains at 80-100% on the three data sets, indicating that the attack of the present invention is more resistant to the defense based on neuronal pruning.

1.4 Ablation Experiment

In the ablation experiment, the influence of the local node entropy on the attack method is researched. Through the experiments on the CIFAR-10 data set, nodes containing different entropies are considered to be found. It can be seen from Table 4 that the success rate and the accuracy of the attack are very low when any node is selected or the node with the minimum local node entropy is selected, and the attack success rate is close to 100% when the maximum node entropy is selected.

TABLE 4

| Comparison of attack success rates caused by different node entropies | | |
|---|---|---|
| Local node entropy | BA | ASR |
| max | 90.04% | 99.57% |
| min | 84.41% | 13.54% |
| random | 88.95% | 93.39% |

Each embodiment in the description is described in a progressive way. The difference of each embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications made to these embodiments will be apparent to those skilled in the art. General principles defined in the present invention can be realized in other embodiments without departing from the spirit or scope of the present invention. Therefore, the present invention will not be limited to these embodiments shown in the present invention, but will conform to the widest scope consistent with the principles and novel features disclosed in the present invention.

What is claimed is:

1. A deep learning backdoor attack method based on an ordinal network, comprising the following steps:
- obtaining a training sample image;
- generating an ordinal network based on the training sample image;
- generating a trigger by using the ordinal network, wherein the trigger is used for generating a malicious image; and
- mixing the feature representation of a malicious image with the feature representation of a benign image by using regularization terms.

2. The deep learning backdoor attack method based on the ordinal network according to claim 1, wherein generating an ordinal network based on the training sample image specifically comprises the following steps:
- extracting an image pixel matrix of the training sample image;
- dividing nodes of the image pixel matrix by taking a sub-pixel matrix composed of adjacent d1×d2 pixel values in the image pixel matrix as a node;
- expanding and indexing the pixel values in each node from left to right and from top to bottom, to generate pixel ordinals represented by index value numbers;
- reordering the pixel ordinals of each node according to pixel value sizes corresponding to index values;
- mapping nodes after reordering of the pixel ordinals to a digraph, and generating an ordinal network by taking a direction from left to right and from top to bottom when the nodes are divided as a positive direction of an edge that connects two digraph nodes in the digraph.

3. The deep learning backdoor attack method based on the ordinal network according to claim 2, wherein mapping nodes after reordering of the pixel ordinals to a digraph specifically comprises:
- classifying the digraph nodes corresponding to the nodes with the same pixel ordinal ordering results into the same kind of digraph nodes and superimposing the digraph nodes.

4. The deep learning backdoor attack method based on the ordinal network according to claim 2, wherein extracting an image pixel matrix of the training sample image specifically comprises:
- splitting the training sample image according to three channels of RGB, to obtain the training sample image of a single channel;
- extracting an image pixel matrix of the training sample image of the single channel as an image pixel matrix of the training sample image.

5. The deep learning backdoor attack method based on the ordinal network according to claim 2, wherein generating a trigger by using the ordinal network specifically comprises the following steps:

calculating a local node entropy of each digraph node in an ordinal network graph;

taking the digraph node corresponding to a maximum calculation result of the local node entropy as a key node in the ordinal network graph;

obtaining a pixel ordinal corresponding to the key node and randomly generating a new pixel ordinal based on the pixel ordinal;

taking the new pixel ordinal as the trigger.

6. The deep learning backdoor attack method based on the ordinal network according to claim 5, wherein calculating a local node entropy of each digraph node in an ordinal network graph specifically comprises the following formula:

$$p_{i,j} = \frac{\text{total of transitions} \prod_i \to \prod_j \text{ in } \{\pi_s^t\}_{s=1,\ldots,n_x}^{t=1,\ldots,n_y}}{2n_x n_y - n_x - n_y}$$

$$p'_{i,j} = p_{i,j} / \sum p_{i,k};$$

$$h_i = -\sum_{j \in O_i} p'_{i,j} \log_2 p'_{i,j};$$

in the formula, $p_{i,j}$ represents a weight of an edge that connects a digraph node i to a digraph node j in the ordinal network graph; total of transitions $$\prod_i \to \prod_j \text{ in } \{\pi_s^t\}_{s=1,\ldots,n_x}^{t=1,\ldots,n_y}$$

represents the total number of horizontally sorted sequences and vertically sorted sequences in the image pixel matrix $$\{\pi_s^t\}_{s=1,\ldots,n_x}^{t=1,\ldots,n_y},$$

wherein s represents a horizontal direction; t represents a vertical direction; $n_x$ represents the number of horizontal nodes; and $n_x$ represents the number of vertical nodes;

$$p'_{i,j}$$

represents a permutation probability of edges that connect the digraph node i to the digraph node j in ordinal network graph;

$h_i$ represents the local node entropy of the digraph node i, $\mathcal{O}_i$ represents a set of all digraph nodes starting from the digraph node i in the ordinal network graph, and $k \in \mathcal{O}_i$.

7. A deep learning backdoor attack device based on an ordinal network, comprising a host computer, wherein the host computer can implement the deep learning backdoor attack method based on the ordinal network according to claim 1 when executing programs.

8. A computer readable storage medium, wherein computer programs are stored on the computer readable storage medium, and when the computer programs are executed by a processor, the deep learning backdoor attack method based on the ordinal network according to claim 1 is implemented.

* * * * *